United States Patent [19]

Fritts et al.

[11] Patent Number: 4,628,593
[45] Date of Patent: Dec. 16, 1986

[54] METHOD FOR FABRICATING BATTERY PLAQUE AND LOW SHEAR NICKEL ELECTRODE

[75] Inventors: David H. Fritts, Dayton; John F. Leonard, Xenia, both of Ohio

[73] Assignee: The United States of America as represented by the Secretary of the Air Force, Washington, D.C.

[21] Appl. No.: 768,790

[22] Filed: Aug. 23, 1985

Related U.S. Application Data

[63] Continuation of Ser. No. 559,170, Dec. 8, 1983, abandoned.

[51] Int. Cl.$^4$ .................. H01M 4/26; H01M 4/80
[52] U.S. Cl. .................. 29/623.1; 204/2.1; 429/223; 429/235
[58] Field of Search ............ 429/235, 233, 209, 223, 429/222, 236, 237, 245; 29/623.1; 204/2.1

[56] References Cited

U.S. PATENT DOCUMENTS

| | | | |
|---|---|---|---|
| 2,251,913 | 8/1941 | Brennan | 429/223 |
| 2,616,165 | 11/1952 | Brennan | 429/235 |
| 2,627,531 | 2/1953 | Vogt | 429/235 |
| 3,055,963 | 9/1962 | Krebs | 429/222 |
| 3,214,355 | 10/1965 | Kandler | 429/235 |
| 3,274,028 | 9/1966 | Okinaka et al. | 204/2.1 |
| 3,335,033 | 8/1967 | Kober | 204/2.1 |
| 3,484,346 | 12/1969 | Bulan et al. | 204/56 |
| 3,926,671 | 12/1975 | Gutjahr | 29/623.5 |
| 4,022,952 | 5/1977 | Fritts | 429/210 |
| 4,145,806 | 3/1979 | Lai | 29/623.1 |
| 4,399,005 | 8/1983 | Fritts et al. | 204/2.1 |

OTHER PUBLICATIONS

D. H. Fritts, "A Discussion of the Causes of Blistering of Sintered Nickel Hydrozide Electrodes", 1981, Journal of Power Sources.

*Primary Examiner*—Anthony Skapars
*Attorney, Agent, or Firm*—Charles E. Bricker; Donald J. Singer

[57] ABSTRACT

A low shear battery plaque and a nickel electrode fabricated therefrom, the latter consisting essentially of a centrally located layer of a conductive felt, layers of sintered nickel on each side of the felt and nickel hydroxide active material disposed throughout the pores of the sintered nickel.

14 Claims, 1 Drawing Figure

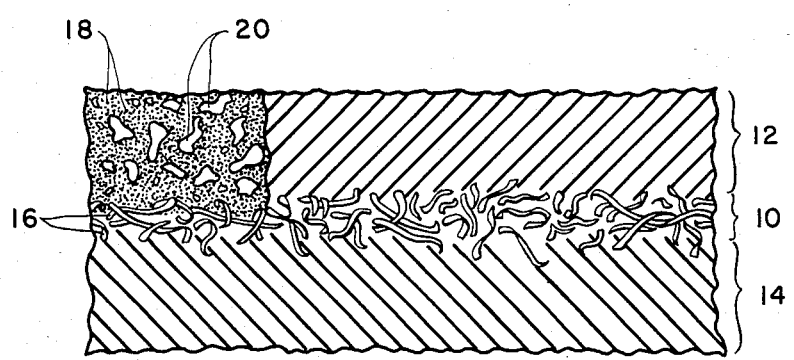

METHOD FOR FABRICATING BATTERY PLAQUE AND LOW SHEAR NICKEL ELECTRODE

RIGHTS OF THE GOVERNMENT

The invention described herein may be manufactured and used by or for the Government of the United States for all governmental purposes without the payment of any royalty.

This is a continuation of application Ser. No. 559,170, filed Dec. 8, 1983, now abandoned.

BACKGROUND OF THE INVENTION

The present invention relates to batteries and more particularly to battery cells having nickel electrodes. In one aspect, this invention relates to novel nickel electrodes; in another aspect it relates to a method for fabricating nickel electrodes.

Large shear stresses exist in sintered nickel hydroxide electrodes. The principal cause of these stresses is the mechanical inhomogeneity introduced by the electrode current collectors, which are substantially more rigid than the nickel sinter, and the molar volume change of the acitve materials during charge and discharge. The shear stresses have been shown to cause fracturing of the electrode at the sinter-collector interface which, in turn, has been related to electrode blistering.

Shear failure can be reduced by incorporating additives, such as cobalt hydroxide, into the electrode. Cobalt, however, is becoming more scarce and higher in cost; thus some manufacturers have reduced the level of cobalt in their nickel electrodes.

Work has been done with gridless electrodes, i.e., electrodes without the current collector. Although gridless electrodes appear to be free of shear stresses, their inherently fragile nature may limit their uses to experimental purposes only.

It is an object of the present invention to provide a low shear electrode plaque.

It is another object to provide a low shear nickel electrode.

Further objects of the present invention include methods for the fabrication of the above plaque and electrode.

Other objects, aspects and advantages of the present invention will become apparent to those skilled in the art upon consideration of the accompanying disclosure.

SUMMARY OF THE INVENTION

In accordance with the present invention there is provided an improved low shear electrode plaque which consists essentially of a centrally located layer of a conductive felt having a layer of sintered metal on each side thereof.

Also in accordance with the present invention there is provided a low shear nickel electrode which consists essentially of a centrally located layer of a conductive felt a layer of sintered metal particles on each side of the felt layer, and nickel hydroxide disposed throughout the sintered layers.

Further provided are methods for fabricating the above plaque and electrode, these methods being described fully below.

BRIEF DESCRIPTION OF THE DRAWING

The FIGURE schematically illustrates the electrode of this invention.

DETAILED DESCRIPTION OF THE INVENTION

Referring now to the drawing the electrode of this invention has a centrally located layer 10 of a conductive felt and layers 12 and 14 of sintered metal particles on each side of the felt 10. The felt layer 10 consists of a plurality of randomly directed felted fibers or strands, a representative few being designated by the numeral 16. The strands 16 may be carbon or graphite fiber or suitable metal strands, such as nickel plated iron, nickel, nickelchromium and the like.

The sintered layers 11 and 14 consists of a plurality of discrete metal particles, a representative few being designated by the numeral 18, sintered together to form a relatively porous structure having a plurality of interconnecting voids 20.

The above structure is fabricated by first providing a sheet of electrically conductive felt, such as nichrome felt metal, available commercially from the Brunswick Corporation. One suitable nichrome felt metal has a thickness of 1 mm and a nominal density of 1.75% of the parent material, and the nichrome strands have a nominal diameter of 12 microns. The felt is then rolled to a thickness in the approximate range of 0.10 to 0.30 mm, preferably about 0.20 to 0.30 mm.

A metal powder slurry is next applied to both sides of the rolled felt using a conventional drawing process. A typical slurry consists of metal particles and water in a one-to-one volume ratio, which is thickened with approximately one percent of a suitable thickening agent, such as sodium carboxymethylcellulose. The thickness of the coating on each side of the rolled felt can vary between 1 and 5 times the thickness of the rolled felt, but generally will be about 1.5 to 2.5 times the felt thickness. Prior to applying the metal powder slurry, the rolled felt, if it is a metal, may be etched in a weak acid solution, for example, 2% nitric acid/ethanol, to improve its wetability.

The thus-coated felt is then sintered in a graphite mold under a reducing atmosphere at an elevated temperature until the metal particles adhere to each other, for example, at about 1000° F. for about 5 to 10 minutes. Prior to sintering, the coated felt may be air dried.

The sintered structure, commonly and hereinafter referred to as a plaque, is then filled with electrochemically active material. In the case of a nickel electrode, the plaque is fabricated using nickel particles and the resulting nickel plaque is activated by positioning it in an electrolyte bath containing nickel nitrate between nickel sheets, with the plaque connected to the negative pole and the sheets connected to the positive pole of a power source, and passing direct current through the electrolyte bath for a time sufficient to convert the metal nitrate, which has impregnated the pores of the plaque, to the corresponding metal hydroxide. Upon completion of this step, the nickel electrode so produced is water washed and dried.

Referring again to the drawing, the sintered layers 12 and 14 do not connect through the felt layer. There is also little or no attachment of the metal particles in the sintered layers to the strands in the felt layer. Instead, the strands are entangled in the sinter, thereby allowing a degree of slippage between the felt backbone and the sinter layers.

Various modifications can be made without departing from the spirit of the invention and the scope of the following claims.

We claim:

1. A method for fabricating a battery plaque which comprises the steps of:
   (a) providing a sheet of electrically conductive felt;
   (b) rolling said felt sheet to a desired thickness to provide a rolled sheet;
   (c) applying a metal powder slurry to both sides of said rolled sheet; and
   (d) sintering said metal powder in a reducing atmosphere, whereby the resulting sintered metal powder layers do not connect through the resulting rolled felt sheet layer and whereby there is substantially no attachment of the metal powder particles in said sintered layers to the strands in said felt layer, thereby allowing a degree of slippage between said felt layer and said sintered layers.

2. The method of claim 1 wherein said conductive felt is a felt metal.

3. The method of claim 2 additionally comprising the step of etching said rolled sheet in a weak acid solution prior to applying said slurry.

4. The method of claim 2 wherein said felt metal is nichrome.

5. The method of claim 1 wherein said conductive felt is carbon fiber felt.

6. The method of claim 1 wherein said felt sheet is rolled to a thickness in the approximate range of 0.10 to 0.30 mm.

7. The method of claim 1 wherein said felt sheet is rolled to a thickness in the approximate range of 0.20 to 0.30 mm.

8. A method for fabricating a nickel electrode which comprises the steps of:
   (a) providing a sheet of electrically conductive felt;
   (b) rolling said felt sheet to a desired thickness to provide a rolled sheet;
   (c) applying a metal powder slurry to both sides of said coated sheet; and
   (d) sintering said metal powder in a reducing atmosphere, whereby the resulting sintered metal powder layers do not connect through the resulting rolled felt sheet layer and whereby there is substantially no attachment of the metal powder particles in said sintered layers to the strands in said felt layer, thereby allowing a degree of slippage between said felt layer and said sintered layers, thereby providing a plaque;
   (e) impregnating said plaque with nickel nitrate; and
   (f) electrically converting the nickel nitrate in said plaque to nickel hydroxide.

9. The method of claim 8 wherein said conductive felt is a felt metal.

10. The method of claim 9 wherein said felt metal is nichrome.

11. The method of claim 8 wherein said conductive felt is a carbon fiber felt.

12. The method of claim 9 additionally comprising the step of etching said rolled sheet in a weak acid solution prior to applying said slurry.

13. The method of claim 8 wherein said felt sheet is rolled to a thickness in the approximate range of 0.10 to 0.30 mm.

14. The method of claim 8 wherein said felt sheet is rolled to a thickness in the approximate range of 0.20 to 0.30 mm.

* * * * *